US010051416B1

(12) United States Patent
Tudor et al.

(10) Patent No.: US 10,051,416 B1
(45) Date of Patent: Aug. 14, 2018

(54) METHODS FOR SELECTIVE GEO-DARKENING

(71) Applicants: Charles R. Tudor, Virginia Beach, VA (US); Dani R. Sleiman, Virginia Beach, VA (US); Dennis R. Jones, Chesapeake, VA (US)

(72) Inventors: Charles R. Tudor, Virginia Beach, VA (US); Dani R. Sleiman, Virginia Beach, VA (US); Dennis R. Jones, Chesapeake, VA (US)

(73) Assignee: Worldwide Live Holding, LLC, Chesapeake, VA (US)

( * ) Notice: Subject to any disclaimer, the term of this patent is extended or adjusted under 35 U.S.C. 154(b) by 0 days.

(21) Appl. No.: 15/478,281

(22) Filed: Apr. 4, 2017

Related U.S. Application Data

(60) Provisional application No. 62/319,044, filed on Apr. 6, 2016, provisional application No. 62/403,629, filed on Oct. 3, 2016.

(51) Int. Cl.
*H04W 4/021* (2018.01)
*H04W 88/02* (2009.01)
*H04W 4/02* (2018.01)

(52) U.S. Cl.
CPC ............ *H04W 4/021* (2013.01); *H04W 4/023* (2013.01); *H04W 88/02* (2013.01)

(58) Field of Classification Search
CPC ....... H04W 4/02; H04W 4/021; H04W 4/023; H04W 4/025; H04W 4/04; H04W 4/06; H04W 4/22; H04W 28/00; H04W 52/0258; H04W 64/00; H04W 76/00
See application file for complete search history.

(56) References Cited

U.S. PATENT DOCUMENTS

| 5,914,941 | A | 6/1999 | Janky |
| 6,615,381 | B1 * | 9/2003 | Fukuda ................. H04H 20/28 455/517 |
| 6,711,622 | B1 | 3/2004 | Fuller et al. |
| 6,970,915 | B1 | 11/2005 | Partovi et al. |

(Continued)

FOREIGN PATENT DOCUMENTS

| CN | 103259709 | 8/2013 |
| CN | 103501392 | 1/2014 |

(Continued)

*Primary Examiner* — Jean Gelin
(74) *Attorney, Agent, or Firm* — Shaddock Law Group, PC

(57) ABSTRACT

A method for selective geo-darkening of mobile electronic devices, including at least some of identifying at least one discrete geographic location; establishing a geo-fence perimeter around at least a portion of the at least one discrete geographic location; controlling each identifiable mobile electronic device within the established geo-fence perimeter to restrict at least some image and/or data exchange capabilities of the identifiable mobile electronic device located within the geo-fence perimeter; selectively controlling each identifiable mobile electronic device to upload images and/ or data captured or generated by each of the identifiable mobile electronic devices for storage remote from each of the identifiable mobile electronic devices; and allowing the uploaded images and/or data captured or generated by each of the identifiable mobile electronic devices to be accessed by at least one authorized user.

20 Claims, 6 Drawing Sheets

(56) References Cited

U.S. PATENT DOCUMENTS

| | | |
|---|---|---|
| 7,738,417 B2 | 6/2010 | Li |
| 7,936,790 B2 | 5/2011 | Schmidt et al. |
| 8,244,068 B2 | 8/2012 | Thorn |
| 8,428,622 B1* | 4/2013 | Zhang .................. H04W 4/023 455/456.3 |
| 8,483,654 B2 | 7/2013 | Levinson et al. |
| 8,526,985 B2 | 9/2013 | Cilli et al. |
| 8,606,073 B2 | 12/2013 | Woodman |
| 8,819,738 B2 | 8/2014 | Gresta |
| 9,070,275 B1* | 6/2015 | Green .................. H04W 4/029 |
| 9,084,021 B2 | 7/2015 | Bieselt et al. |
| 9,251,852 B2 | 2/2016 | Burns |
| 9,363,539 B2 | 6/2016 | Das |
| 9,408,031 B1* | 8/2016 | Steger .................. H04W 4/021 |
| 9,473,815 B1* | 10/2016 | Inzerillo ............ H04N 21/4508 |
| 2002/0085029 A1 | 7/2002 | Ghani |
| 2002/0087592 A1 | 7/2002 | Ghani |
| 2003/0045322 A1* | 3/2003 | Baer ................. H04B 7/18506 455/527 |
| 2003/0217150 A1* | 11/2003 | Roese ....................... G01S 5/02 709/225 |
| 2004/0073437 A1 | 4/2004 | Halgas, Jr. et al. |
| 2006/0206561 A1 | 9/2006 | Chen et al. |
| 2007/0239562 A1 | 10/2007 | Lawson |
| 2007/0297359 A1 | 12/2007 | Li |
| 2008/0133767 A1 | 6/2008 | Birrer et al. |
| 2009/0268047 A1* | 10/2009 | Sogoh .................... G03B 17/20 348/222.1 |
| 2011/0088068 A1 | 4/2011 | Patnoe et al. |
| 2011/0285863 A1 | 11/2011 | Burke et al. |
| 2012/0064947 A1 | 3/2012 | Yi et al. |
| 2012/0284755 A1 | 11/2012 | Keret et al. |
| 2013/0286211 A1 | 10/2013 | Cao |
| 2013/0312041 A1 | 11/2013 | Gresta |
| 2014/0005930 A1* | 1/2014 | Chu ....................... G01C 21/30 701/445 |
| 2014/0101781 A1 | 4/2014 | Bouknight |
| 2014/0143004 A1* | 5/2014 | Abhyanker .......... G06Q 10/087 705/7.19 |
| 2014/0160223 A1 | 6/2014 | Bieselt et al. |
| 2014/0331255 A1 | 11/2014 | Howe et al. |
| 2015/0020135 A1 | 1/2015 | Frusina et al. |
| 2015/0042447 A1 | 2/2015 | Vogt et al. |
| 2015/0043892 A1 | 2/2015 | Groman |
| 2015/0295726 A1* | 10/2015 | Bland .................. H04L 12/189 709/203 |
| 2015/0334687 A1* | 11/2015 | Ventulett ............. H04W 72/042 455/419 |
| 2015/0355804 A1* | 12/2015 | Nguyen ........... H04N 21/23103 715/756 |
| 2016/0007067 A1 | 1/2016 | Lai et al. |
| 2016/0014455 A1 | 1/2016 | Jabara et al. |
| 2016/0037187 A1 | 2/2016 | Das |
| 2016/0057457 A1 | 2/2016 | Clements et al. |
| 2016/0105770 A1 | 4/2016 | Christian |
| 2016/0127384 A1* | 5/2016 | VoBa ...................... G06F 21/53 726/7 |
| 2016/0156953 A1 | 6/2016 | Phipps et al. |
| 2016/0344801 A1* | 11/2016 | Akkarawittayapoom ................................ H04L 67/10 |
| 2017/0150308 A1* | 5/2017 | Jones ................... H04W 4/021 |
| 2017/0228785 A1* | 8/2017 | Evje ................... G06Q 30/0261 |
| 2017/0270565 A1* | 9/2017 | Filatoff ............. G06Q 30/0261 |

FOREIGN PATENT DOCUMENTS

| | | |
|---|---|---|
| WO | WO2011043886 | 4/2011 |
| WO | WO2014035818 | 3/2014 |
| WO | WO2015107522 | 7/2015 |

* cited by examiner

METHODS FOR SELECTIVE GEO-DARKENING

CROSS-REFERENCE TO RELATED APPLICATIONS

This patent application claims the benefit of U.S. Patent Application Ser. No. 62/319,044, filed Apr. 6, 2016 and U.S. Patent Application Ser. No. 62/403,629, filed Oct. 3, 2016, the disclosures of which are incorporated herein in their entireties by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of mobile or other electronic devices capable of wirelessly receiving, transmitting, or otherwise exchanging data over various distances. More specifically, the presently disclosed systems and/or methods relate to methods for selectively embargoing or restricting the receipt, transmission, or exchange of images and/or data, via mobile electronic devices, based on a determined geographic location.

2. Description of Related Art

Numerous mobile electronic devices, such as, for example, mobile phones, tablets, portable media players, and multi-purpose pocket computers include features and applications (apps) that allow users to readily disseminate or exchange images and/or data via, for example, cellular telephone communications, texts, social media outlets, traditional media outlets, through real-time streaming of captured video, and other methods. Many known mobile electronic devices also include at least one camera that allows the mobile electronic device to capture video or still images. The captured video or still images can be stored locally on the mobile electronic device, uploaded for remote or "cloud" storage, and/or streamed live through various Internet outlets.

While there are many instances where the immediate or prompt sharing of images and/or data, via mobile electronic devices, is helpful and can be useful to law enforcement or members of the public, in certain situations, the real time or slightly delayed sharing of images and/or data can be detrimental. For example, providing live news broadcast and/or social media video streaming capabilities, during highly volatile and evolving situations, can pose a threat to citizens or to law and security enforcement efforts. In addition, it can be a source of embarrassment for victims of an accident or crime to have video or photographic images of them posted, for example, to the Internet.

If law enforcement personnel respond to a situation, such as, for example, an ongoing hostage situation, an act of terrorism, a bank robbery in progress, or any other unresolved or involving situation, the broadcasting of information, photographs, videos, and the like, can provide perpetrators with advantageous information regarding the efforts of law enforcement to respond to the situation. It is now becoming more commonplace for sophisticated perpetrators to search and monitor social or other media outlets and platforms in an effort to find live streaming video feeds that could give them increased situational awareness concerning law enforcement officers aligning or preparing to engage the perpetrator.

As livestreaming becomes more pervasive, criminals and terrorists can use those unregulated platforms to gain an advantage over the stealth of law enforcement tactics.

Currently, law enforcement agents are only able to respond to the potential dissemination of potentially tactically advantageous information by physically removing individuals from the scene and the surrounding area, by confiscating mobile electronic devices, or by asking citizens and news reporters in the vicinity to refrain from using social media or other outlets to live stream video or other information. In certain instances, law enforcement officers have asked professional news organizations to embargo, or stop broadcasting, their live reporting of terror related events for the sake of denying perpetrators such live broadcast information for fear that the information would allow the perpetrators to gain situational awareness of law enforcement's tactical offensives, rescue efforts, or movements.

Contrastingly, it can be very advantageous to collect and compile video, still images, or other information, recorded at the scene, from numerous sources. Having such information can allow post-incident analysis and potentially provide a more accurate or truthful depiction of how events unfolded.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

Unfortunately, physically removing all of the individuals capable of sharing images and/or data via a mobile electronic device from the proximity of an active and dynamic scene is impractical, if not impossible. Furthermore, merely requesting and relying on citizens or professionals to refrain from providing live or only slightly delayed images and/or data is not an effective way to ensure that images and/or data is not "leaked". Additionally, if citizens or news professionals are unable to utilize their mobile electronic devices to, for example, capture video during an event, or if such captured video is merely stored on the mobile electronic device, itself, it may be more difficult for the truth about a situation to be verified.

In order to overcome these and various other shortcomings, various exemplary, nonlimiting embodiments of the present disclosure optionally provide a feature, which can be implemented via embedded software, an app, or the like, that selectively embargoes or restricts the receipt, transmission, or exchange of images and/or data, via mobile electronic devices, within a determined geographic area.

The systems and/or methods of the present disclosure turn cameras that could be misused or misappropriated by criminals or terrorists into cameras that provide law enforcement, rescue personnel, or first responders a situational awareness advantage. The modern day streaming media savvy version of the "look-out" who may be monitoring live video streams to support criminal activity is thwarted and negated.

To provide greater use of and control of live streamed video for the advantage of, for example, current law enforcement efforts or victim privacy, and to curtail the ability of the misuse of such video by, for example, law breakers, terrorists, or would be profiteers, the systems and/or methods of the present disclosure provide law enforcement or other authorized agents with the ability to establish a temporary or permanent geo-fence around an active crime scene, accident scene, or other restricted area. Once the geo-fence has been created, the area within the geo-fence can be geo-darkened to prohibit the transmission or receipt of data, via mobile electronic devices, within the geo-fenced and geo-darkened area.

In certain exemplary embodiments of the present disclosure, users and/or streaming platforms may participate in mobile electronic device or camera embargoing from public, social media, and/or unauthorized news connection views.

However, while it can be advantageous to embargo or restrict the unauthorized, free exchange of images and/or data, such images and/or data can be immediately helpful to law enforcement, search and rescue personnel, and/or other first responders. Therefore, in certain exemplary, nonlimiting embodiments of the present disclosure, the disclosed systems and/or methods optionally provide for embargoed or restricted images and/or data to be immediately available to authorized user(s). Thus, for example, a live stream video feed, produced within a geo-darkened area, will not be able to be transmitted for media broadcast, via a social media outlet, but can be transmitted to, received by, and available for authorized, law enforcement agents. This can provide authorized, law enforcement agents with valuable, real-time images and/or data regarding an event, as it unfolds.

If images and/or data is only stored in the local storage of a mobile electronic device, it is possible that the images and/or data can be lost, due to accidental or intentional deletion of the images and/or data, failure of the local storage device, confiscation or destruction of the mobile electronic device, or the like. Thus, in certain exemplary, nonlimiting embodiments of the present disclosure, while a mobile electronic device is subject to a geo-darkened embargo, images and/or data of the mobile electronic device is automatically uploaded for remote storage such as in a cloud Internet service. In various exemplary embodiments, the systems and/or methods of the present disclosure provide for delayed availability of the uploaded and remotely stored images and/or data.

In certain exemplary, nonlimiting embodiments of the present disclosure optionally provide a method for selective geo-darkening of mobile electronic devices, comprising: identifying a discrete geographic location; generating a map, wherein the map represents a geographic area surrounding at least a portion of the discrete geographic location; identifying each identifiable mobile electronic device within at least a portion of the geographic area represented by the map; determining a proximate location of each identifiable mobile electronic device; providing a graphical representation of each identifiable mobile electronic device on the map; establishing a geo-fence perimeter around at least a portion of the discrete geographic location; providing a graphical representation of the geo-fence perimeter on the map, wherein the geo-fence perimeter represents a virtual perimeter or area, depicted on the map; selectively controlling at least some of the identifiable mobile electronic devices to restrict at least some image and/or data exchange capabilities of each of the identifiable mobile electronic devices located within the geo-fence perimeter; and controlling each of the identifiable mobile electronic devices to upload images and/or data captured or generated by each of the identifiable mobile electronic devices for storage remote from each of the identifiable mobile electronic devices.

In these exemplary, nonlimiting embodiments, the method also optionally comprises the step of allowing the uploaded images and/or data captured or generated by each of the identifiable mobile electronic devices to be accessed by at least one authorized user.

In these exemplary, nonlimiting embodiments, the method also optionally comprises the step of removing the geo-fence perimeter and controlling each electronic mobile device to allow unrestricted operation of the image and/or data exchange capabilities of each of the identifiable mobile electronic devices.

In these exemplary, nonlimiting embodiments, the method also optionally comprises the step of allowing, after the geo-fence perimeter has been removed, access to any image and/or data that was uploaded for storage remote from each of the identifiable mobile electronic devices. Optionally and additionally, after the geo-fence perimeter has been removed, each discrete, identifiable mobile electronic device is allowed to access any image and/or data that was uploaded for storage remote from that discrete, identifiable mobile electronic device.

In various exemplary, nonlimiting embodiments, the discrete geographic location is identified as a location of an incident.

In various exemplary, nonlimiting embodiments, at least some image and/or data exchange capabilities of each of the identifiable mobile electronic devices located within the geo-fence perimeter is restricted.

In various exemplary, nonlimiting embodiments, the map is only displayed to one or more authorized users.

In various exemplary, nonlimiting embodiments, each identifiable mobile electronic device is identified utilizing GPS location information provided by the identifiable mobile electronic device.

In various exemplary, nonlimiting embodiments, the image and/or data exchange capabilities of each identifiable mobile electronic device located within the geo-fence perimeter are controlled via software executing commands to the identifiable mobile electronic device.

In various exemplary, nonlimiting embodiments, controlling each identifiable mobile electronic device to restrict at least some image and/or data exchange capabilities of the identifiable mobile electronic device located within the geo-fence perimeter further comprises controlling each identifiable mobile electronic device such that images and/or data cannot be modified, deleted, or erased from the identifiable mobile electronic device.

In various exemplary, nonlimiting embodiments, controlling each identifiable mobile electronic device to restrict at least some image and/or data exchange capabilities of the identifiable mobile electronic device located within the geo-fence perimeter does not restrict the ability of the identifiable mobile electronic device to transmit geolocation data.

In certain exemplary, nonlimiting embodiments of the present disclosure optionally provide a method for selective geo-darkening of mobile electronic devices, comprising: identifying a discrete geographic location; establishing a geo-fence perimeter around at least a portion of the discrete geographic location; selectively controlling each identifiable mobile electronic device within the established geo-fence perimeter to restrict at least some image and/or data exchange capabilities of the identifiable mobile electronic device located within the geo-fence perimeter; and controlling each identifiable mobile electronic device to upload images and/or data captured or generated by each of the identifiable mobile electronic devices for storage remote from each of the identifiable mobile electronic devices.

In these exemplary, nonlimiting embodiments, the method also optionally comprises the step of allowing the uploaded images and/or data captured or generated by each of the identifiable mobile electronic devices to be accessed by at least one authorized user.

In these exemplary, nonlimiting embodiments, the method also optionally comprises the step of removing the geo-fence perimeter; and controlling each electronic mobile device to allow unrestricted operation of the image and/or data exchange capabilities of each of the identifiable mobile electronic devices.

In these exemplary, nonlimiting embodiments, the method also optionally comprises the step of allowing, after the geo-fence perimeter has been removed, access any image and/or data that was uploaded for storage remote from each of the identifiable mobile electronic devices.

In various exemplary, nonlimiting embodiments, the image and/or data exchange capabilities of each identifiable mobile electronic device located within the geo-fence perimeter are controlled via software executing commands to the identifiable mobile electronic device.

In various exemplary, nonlimiting embodiments, selectively controlling each identifiable mobile electronic device within the established geo-fence perimeter to restrict at least some image and/or data exchange capabilities of the identifiable mobile electronic device located within the geo-fence perimeter further comprises controlling at least some image and/or data exchange capabilities of each identifiable mobile electronic device located within the geo-fence perimeter.

In various exemplary, nonlimiting embodiments, controlling each identifiable mobile electronic device to restrict at least some image and/or data exchange capabilities of the identifiable mobile electronic device located within the geo-fence perimeter further comprises controlling each identifiable mobile electronic device such that images and/or data cannot be modified, deleted, or erased from the identifiable mobile electronic device.

In certain exemplary, nonlimiting embodiments of the present disclosure optionally provide a method for selective geo-darkening of mobile electronic devices, comprising: identifying at least one discrete geographic location; establishing a geo-fence perimeter around at least a portion of the at least one discrete geographic location; controlling each identifiable mobile electronic device within the established geo-fence perimeter to restrict at least some image and/or data exchange capabilities of the identifiable mobile electronic device located within the geo-fence perimeter; controlling each identifiable mobile electronic device to upload images and/or data captured or generated by each of the identifiable mobile electronic devices for storage remote from each of the identifiable mobile electronic devices; and allowing the uploaded images and/or data captured or generated by each of the identifiable mobile electronic devices to be accessed by at least one authorized user.

Accordingly, the present disclosure separately and optionally provides methods for at least temporarily embargoing or restricting the receipt, transmission, or exchange of images and/or data, via mobile electronic devices, within a determined geographic area.

The present disclosure separately and optionally provides methods for causing a mobile electronic device "Blackout" within a designated geographic area, for law enforcement, during an incident.

The present disclosure separately and optionally provides methods for allowing real time access to embargoed or restricted images and/or data by authorized user(s).

The present disclosure separately and optionally provides methods for remote back up or saving of embargoed or restricted images and/or data for later access and/or distribution.

The present disclosure separately and optionally provides methods for alerting users within a geo-fenced area of an event requiring geo-darkening.

The present disclosure separately and optionally provides methods for subjecting certain mobile electronic devices located within a geo-fenced perimeter or geo-darkened area to a geo-darkened embargo (i.e., geo-darkened), while other mobile electronic devices located within the geo-fenced perimeter or geo-darkened area are selectively exempted from the geo-darkened embargo (i.e., geo-whitened).

These and other aspects, features, and advantages of the presently disclosed systems and/or methods are described in or are apparent from the following detailed description of the exemplary, non-limiting embodiments of the presently disclosed systems and/or methods and the accompanying figures. Other aspects and features of embodiments of the presently disclosed systems and/or methods will become apparent to those of ordinary skill in the art upon reviewing the following description of specific, exemplary embodiments of the presently disclosed systems and/or methods in concert with the figures. While features of the presently disclosed systems and/or methods may be discussed relative to certain embodiments and figures, all embodiments of the presently disclosed systems and/or methods can include one or more of the features discussed herein. Further, while one or more embodiments may be discussed as having certain advantageous features, one or more of such features may also be used with the various embodiments of the systems and/or methods discussed herein. In similar fashion, while exemplary embodiments may be discussed below as device, system, or method embodiments, it is to be understood that such exemplary embodiments can be implemented in various devices, systems, and methods of the presently disclosed systems and/or methods.

Any benefits, advantages, or solutions to problems that are described herein with regard to specific embodiments are not intended to be construed as a critical, required, or essential feature(s) or element(s) of the presently disclosed systems and/or methods or the claims.

BRIEF DESCRIPTION OF THE SEVERAL
VIEWS OF THE DRAWINGS

As required, detailed exemplary embodiments of the presently disclosed systems and/or methods are disclosed herein; however, it is to be understood that the disclosed embodiments are merely exemplary of the presently disclosed systems and/or methods that may be embodied in various and alternative forms, within the scope of the presently disclosed systems and/or methods. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems and/or methods.

The exemplary embodiments of the presently disclosed systems and/or methods will be described in detail, with reference to the following figures, wherein like reference numerals refer to like parts throughout the several views, and wherein.

Figure 5:
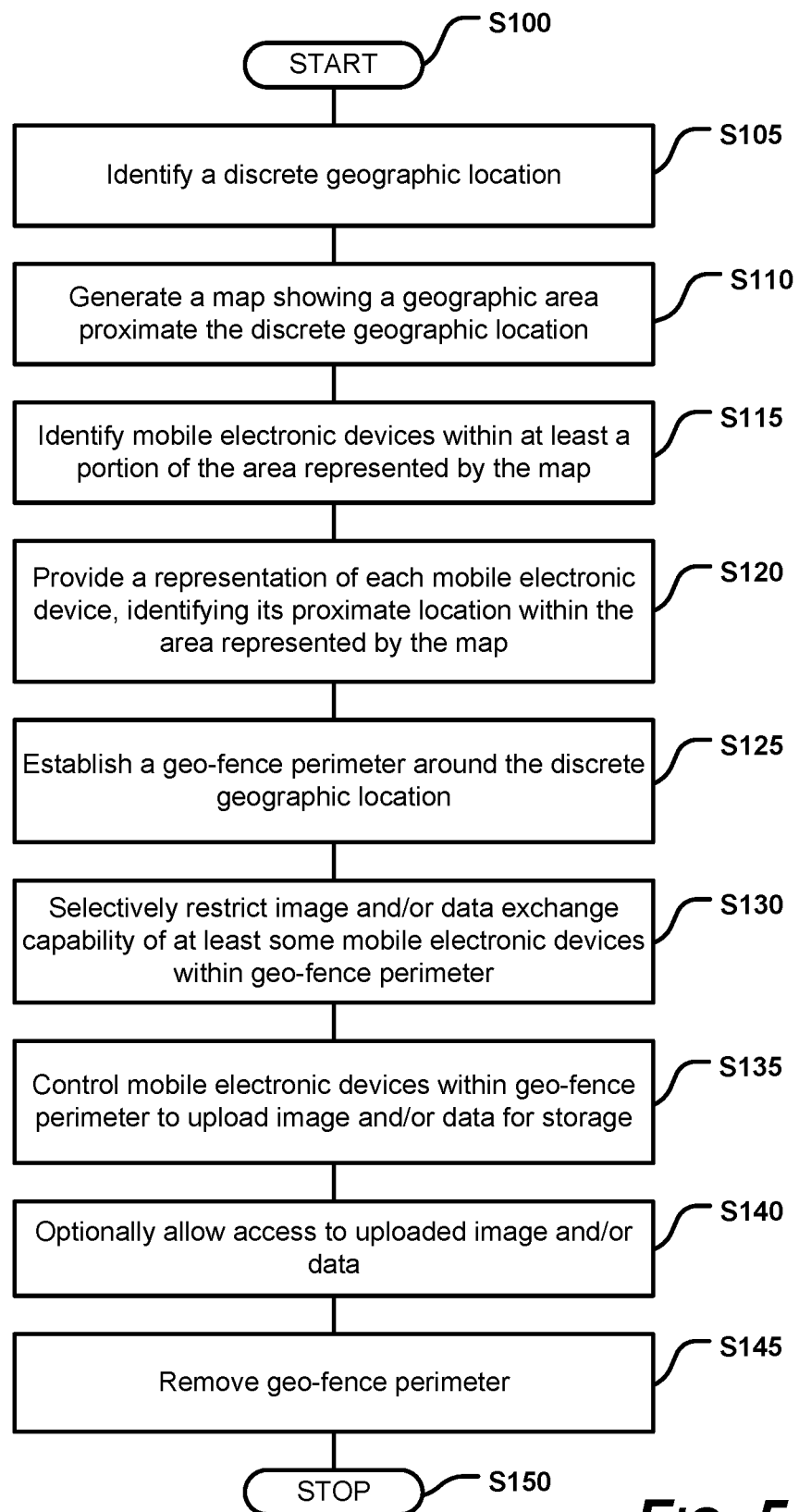
Figure 6:
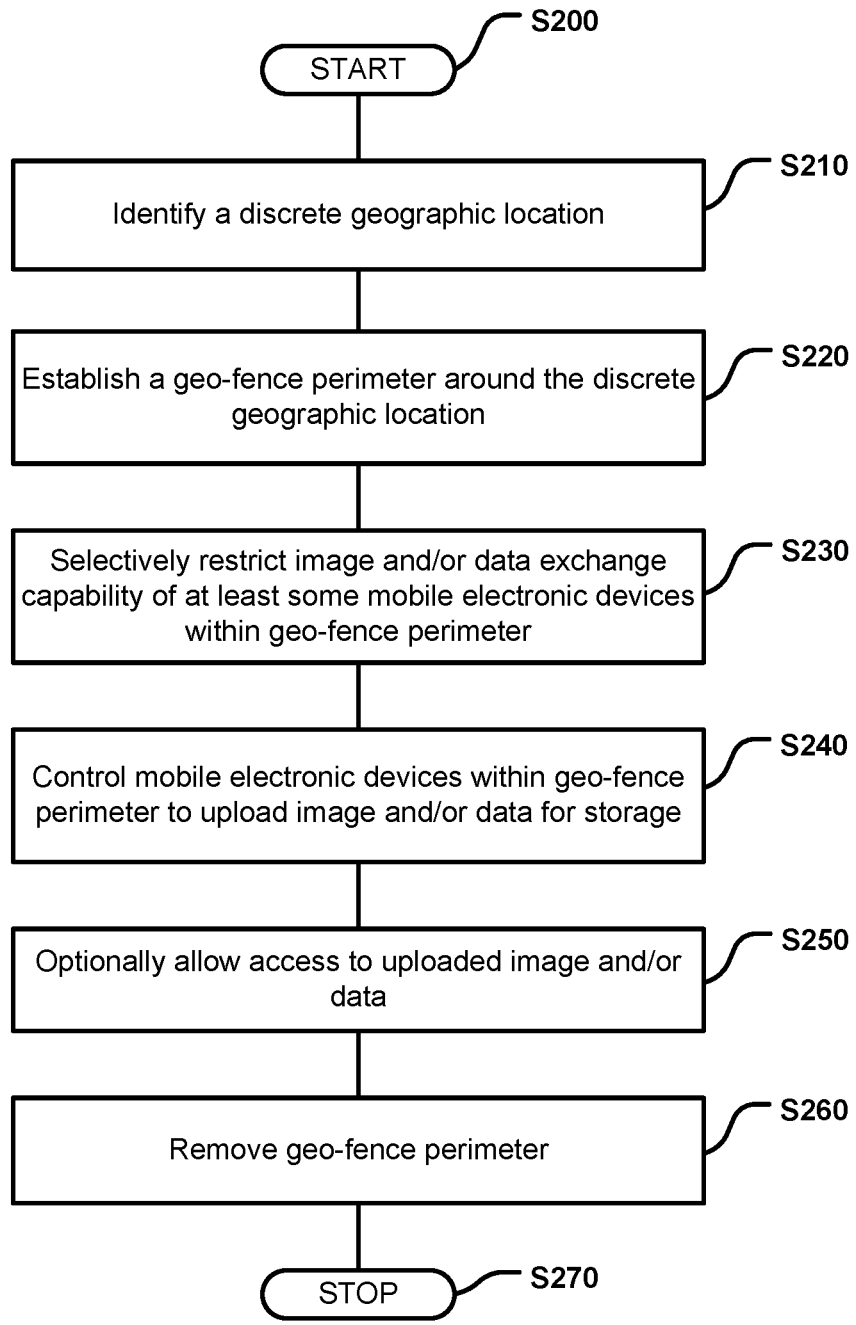

FIG. 5 illustrates an exemplary flowchart outlining exemplary steps for at least temporarily embargoing or restricting the receipt, transmission, or exchange of images and/or data, via mobile electronic devices, within a determined geographic area, according to the present disclosure; and FIG. 6 illustrates an exemplary flowchart outlining exemplary steps for at least temporarily embargoing or restricting the receipt, transmission, or exchange of images and/or data, via mobile electronic devices, within a determined geographic area, according to the present disclosure.

DETAILED DESCRIPTION OF EXEMPLARY EMBODIMENTS OF THE PRESENT DISCLOSURE

For simplicity and clarification, the design factors and operating principles of the systems and/or methods for selective geo-darkening, according to the present disclosure, are explained with reference to various exemplary embodiments of the systems and/or methods for selective geo-darkening, according to the present disclosure. The basic explanation of the design factors and operating principles of the systems and/or methods for selective geo-darkening is applicable for the understanding, design, and operation of the systems and/or methods for selective geo-darkening of the presently disclosed systems and/or methods. It should be appreciated that the systems and/or methods for selective geo-darkening can be adapted to any applications where selective geo-darkening can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The terms "a" and "an" are defined as one or more unless stated otherwise. Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "mobile electronic device", "geo-fencing", and "geo-darkening", and "images and/or data" are used for basic explanation and understanding of the operation of the presently disclosed systems and/or methods. Therefore, the terms "mobile electronic device", "geo-fencing", "geo-darkening", and "images and/or data" are not to be construed as limiting the presently disclosed systems and/or methods. Thus, for example, the term "mobile electronic device" is to be understood to broadly include any mobile phone, smart phone, tablet, portable media player, multi-purpose pocket computer, iPad, Google Tablet, Android platform, point of view camera, still or video camera, and the like.

For simplicity and clarification, selective geo-darkening features of the presently disclosed systems and/or methods will be described as being utilized in conjunction with mobile electronic devices, such as, for example, mobile phones. However, it should be appreciated that these are merely exemplary embodiments of the disclosed selective geo-darkening features and are not to be construed as limiting the presently disclosed systems and/or methods. Thus, the presently disclosed systems and/or methods for selective geo-darkening may be utilized in conjunction with any mobile electronic or other device capable of capturing, receiving, and/or transmitting images and/or data.

It should also be understood that the term "images and/or data", as used herein, is intended to encompass all types of images, whether still or video images and all types of data, whether the data is in the form of texts, tweets, emails, attachments, documents, or other packets of information that can be generated, received, or transmitted by the mobile electronic device.

Turning now to the appended drawing figures, FIGS. 1-4 illustrate certain elements and/or aspects of an exemplary embodiment of the selective geo-darkening features of the present disclosure, while FIGS. 5 and 6 illustrate exemplary flowcharts outlining exemplary steps for at least temporarily embargoing or restricting the receipt, transmission, or exchange of images and/or data, via mobile electronic devices, within a determined geographic area, according to the present disclosure.

In various exemplary, nonlimiting embodiments, the systems and/or methods disclosed herein are implemented as software executing on a mobile electronic device, a programmed general-purpose computer, a special purpose computer, a microprocessor, or the like. In various exemplary embodiments, the systems and/or methods disclosed herein may be implemented as an app residing in a mobile electronic device, a routine embedded in a network client, as a resource residing on a network server, or the like. The systems and/or methods disclosed herein may also be implemented by incorporation into a software and/or hardware system, such as the hardware or firmware systems of a mobile electronic device or the like. In general, any device, capable of implementing the systems and/or methods disclosed herein and that is, in turn, capable of implementing or at least partially implementing the steps outlined in the exemplary flowchart shown in FIG. 5 or 6, can be used to implement the systems and/or methods disclosed herein.

Furthermore, it should be understood and appreciated that the software for implementing the systems and/or methods of the present disclosure may be optionally incorporated into the mobile electronic device and activated or deactivated by a user or may be embedded within the mobile electronic device, such that a user is unable to control activation or deactivation of the selective geo-darkening features of the present disclosure.

In addition, the selective geo-darkening features of the present disclosure can also coordinate and deliver live video streams from other participating live streaming platforms such as: Facebook Live, Instagram, Twitter, Livestream, Periscope, Stringwire, YouTube Live, Bambuser, Meerkat, It'sMe, Live.me, UStream, Mini Webcam, CloudCam, Report-it Live, TwitCasting Live, Broadcast Me, BigVEncoder, Newzulu, Broadcaster, Wirecast Cam, Hang W/, and others. These platforms and/or their users may opt into the selective geo-darkening features of the present disclosure as safety conscious organizations and citizens giving permission for their mobile electronic devices to fall under selective geo-darkening protocols. The incorporation of these and/or other features of the present disclosure is optional for other platforms and/or users, but is provided via software or an App of the present disclosure.

Figure 1:
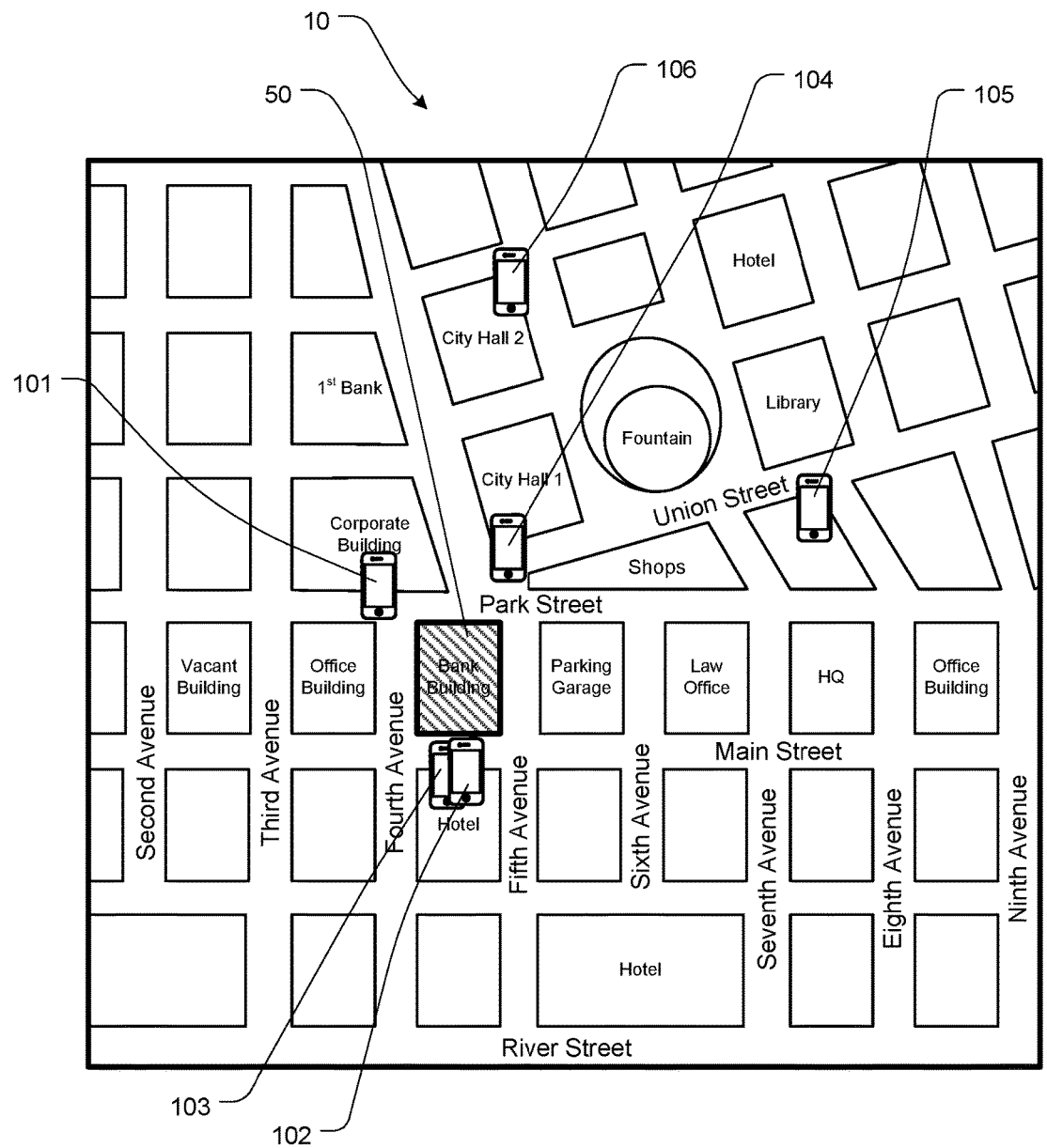
FIG. 1 illustrates a portion of an exemplary map, wherein the exemplary map identifies a discrete geographic location and provides representations of discrete mobile electronic devices located within the area illustrated by the exemplary map, according to the present disclosure.

FIG. 1 illustrates a portion of a map 10. As illustrated, the map 10 identifies a discrete geographic location 50 and provides representations of discrete mobile electronic devices 101-106 located within the area illustrated by the map 10. It should be understood that the map 10, as illustrated in FIGS. 1-4, is merely for the purpose of explanation and is not meant to limit the present disclosure in any way. The area represented by the map 10 may be determined by a user, based upon the geographic area relative to the discrete geographic location 50.

During an incident, they discrete geographic location 50 is identified. In this exemplary embodiment, the discrete geographic location 50 is a bank building located within the map 10. It should be appreciated that the discrete geographic location 50 may be any location, whether a building, structure, road segment, park, open area, or the like. The specific location and area consumed by the discrete geographic location 50 will generally be dictated by the size and scope of the incident. In certain exemplary embodiments, the discrete geographic location 50 may comprise a dynamic location, in that the discrete geographic location 50 may expand, contract, or move, based on the events of the incident.

An incident may, for example, be a civil disturbance, an act of terrorism, a bank robbery, a hostage situation, an industrial accident, a traffic accident, a travel route utilized by a dignitary or celebrity, or any emergency or other activity, typically requiring the assistance of law enforcement, search and rescue personnel, and/or first responders. Thus, it should be appreciated that the incident in the discrete geographic location 50 may be substantially static (i.e., confined to a single, discrete geographic location) or substantially dynamic (i.e., expanding or contracting within a geographic location, moving within a geographic location, or moving between various geographic locations).

The mobile electronic device, as illustrated as mobile electronic devices 101-106, each typically comprise at least some of a display, which may also function as a touchscreen input device, one or more cameras configured to capture video and/or still images, an audio interface comprising at least one microphone and at least one speaker, one or more device orientation sensors, such as, for example, an internal gyroscope and/or other device orientation sensors, and the requisite hardware and/or software for functional operation of the mobile electronic devices 101-106.

In certain exemplary embodiments, the mobile electronic devices 101-106 further comprises at least some of wireless transceiver capabilities, such as, for example, cellular, Bluetooth, or the like for exchanging data over various distances, Global Positioning System (GPS) receiving sensors and/or software for receiving GPS signals and providing geolocation data and information regarding the global position of the mobile electronic devices 101-106.

It should be appreciated that this listing of features and/or elements included in the mobile electronic devices 101-106 is exemplary and not exhaustive. Thus, it should be understood that the mobile electronic devices 101-106, as shown and described, represent only one possible embodiment with one possible combination of features and elements. The features and elements that make up the mobile electronic devices 101-106 and the methods for implementing required and optional software for operation of the mobile electronic devices 101-106, is known in the art. Therefore, a more detailed explanation of the mobile electronic devices 101-106, the constituent components of the mobile electronic devices 101-106, instructions regarding how to incorporate the required and optional elements and/or software into the mobile electronic devices 101-106, methods for implementing apps and software on the mobile electronic devices 101-106, and certain other items and/or techniques necessary for the implementation and/or operation of the various exemplary embodiments of the presently disclosed systems and/or methods are not provided herein because such elements are commercially available and/or such background information will be known to one of ordinary skill in the art. Therefore, it is believed that the level of description provided herein with regard to the mobile electronic devices 101-106 and implementation of the techniques, methods, and/or apparatuses of the present disclosure is sufficient to enable one of ordinary skill in the art to understand and practice the techniques and/or methods, as described.

As further illustrated in FIGS. 1-4, exemplary mobile electronic devices 101-106 are displayed, using the systems and/or methods of the present disclosure, showing their relative positions on the map 10. Each of the exemplary mobile electronic devices 101-106 is controlled, as described herein, by the systems and/or methods of the present disclosure. In various exemplary embodiments, the relative position of each of the mobile electronic devices 101-106 is determined based on GPS information provided by each of the mobile electronic devices 101-106.

In an exemplary scenario, an incident, such as, for example, a bank robbery/hostage situation is reported at a bank building. Thus, the bank building is identified as a discrete geographic location 50. The map 10 provides an overview of the general geographic area surrounding the discrete geographic location 50. The map 10 also provides the relative location of each mobile electronic device 101-106, within the map 10, as provided by each mobile electronic device 101-106.

Figure 2:
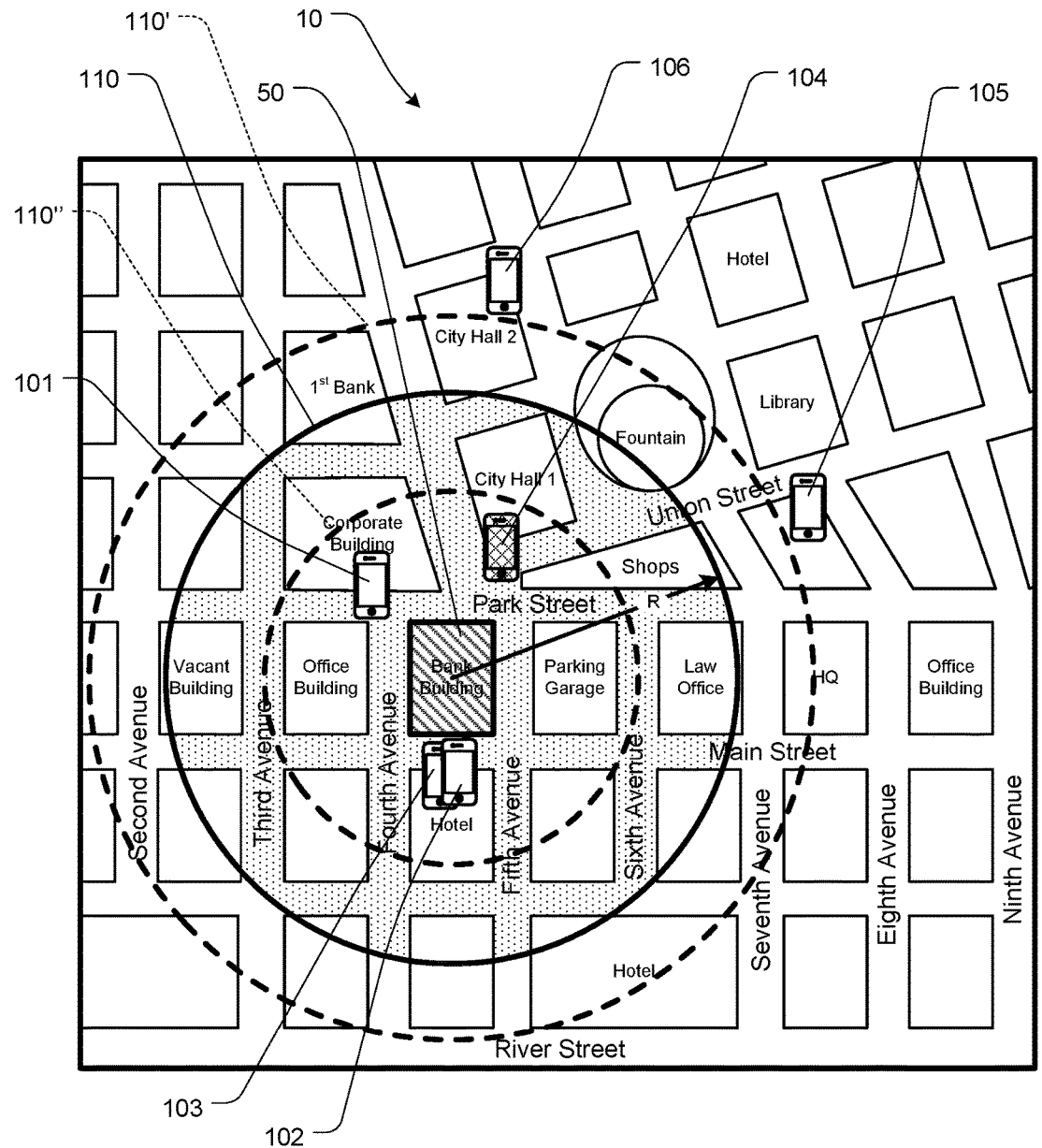
FIG. 2 illustrates a portion of an exemplary map, wherein the exemplary map identifies a discrete geographic location, provides representations of discrete mobile electronic devices, and provides a representation of an exemplary geo-darkened area located within the area illustrated by the exemplary map, according to the present disclosure.

As illustrated in FIG. 2, when the incident is identified at the bank building, the map 10 identifies the bank building as the discrete geographic location 50 and provides representations of discrete mobile electronic devices 101-106 at their relative locations. A geo-fenced area 110 is then established. In various exemplary embodiments, the geo-fenced area 110 is automatically established at a predetermined or predefined distance from the discrete geographic location 50. In these exemplary embodiments, the predetermined or predefined distance may be dictated based on, for example, information regarding the area in which the incident is occurring (i.e., within a crowded city area, within a residential community, within an isolated area, etc.). Determination of the predetermined or predefined distance may be guided by a generally anticipated area that could be affected by the incident and/or a distance at which it is likely for individuals to be within visual range of the incident.

Alternatively, the geo-fenced area 110 may optionally be established manually, by an authorized operator, by identifying the discrete geographic location 50 and selecting a desired area for the geo-fenced area 110.

As further illustrated in FIG. 2, a geo-fenced area 110 is established at a given radius, R, from the discrete geographic location 50. The geo-fenced area 110 may also be established or reestablished as an expanded geo-fenced area 110' or a contracted geo-fenced area 110". The transition from geo-fenced area 110 to geo-fenced area 110' or geo-fenced area 110" may be made based upon the expanding or contracting nature of the identified incident.

Figure 3:
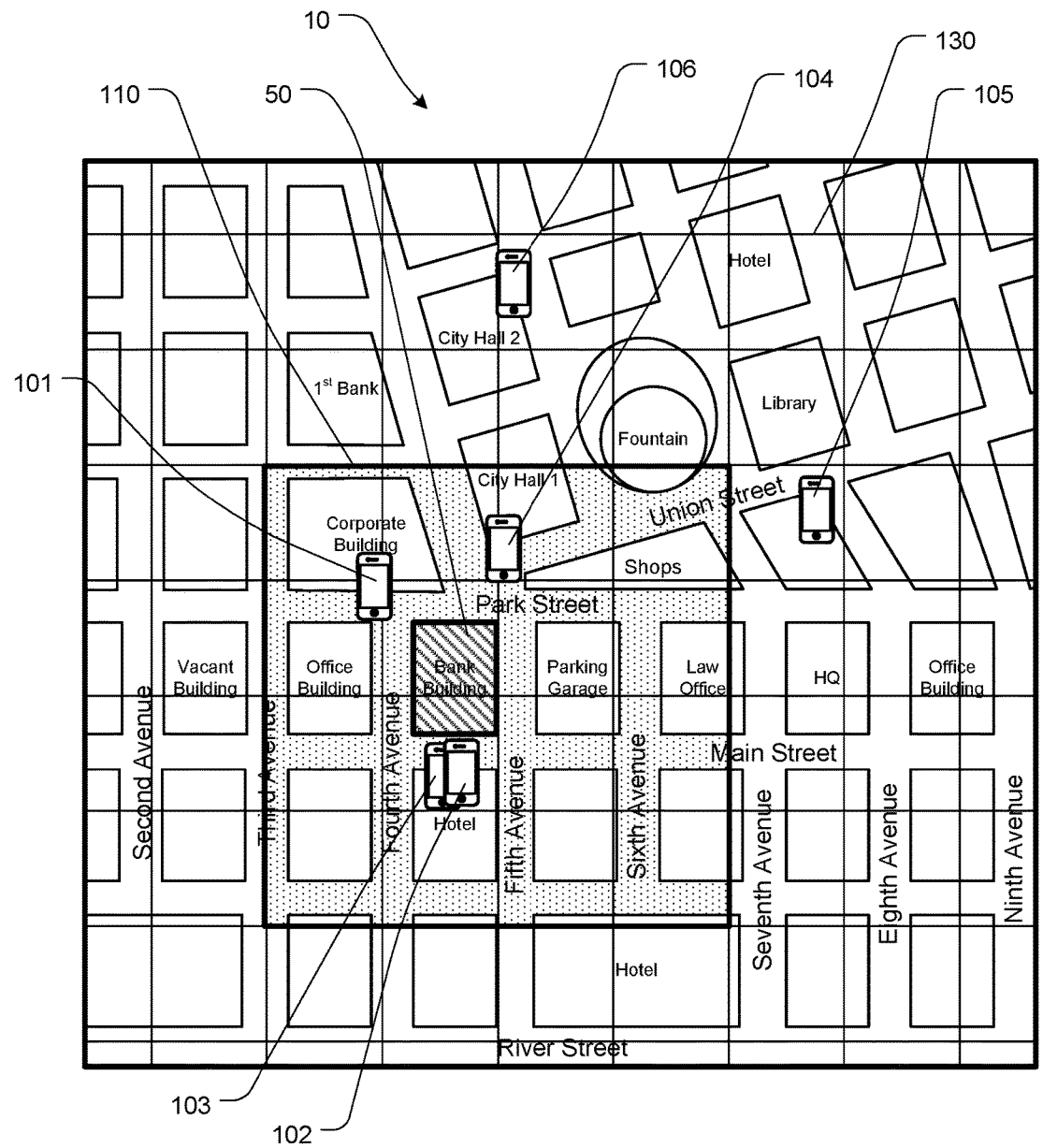
FIG. 3 illustrates a portion of an exemplary map, wherein the exemplary map identifies a discrete geographic location, provides representations of discrete mobile electronic devices, and provides a representation of an exemplary geo-darkened area located within the area illustrated by the exemplary map, according to the present disclosure.
Figure 4:
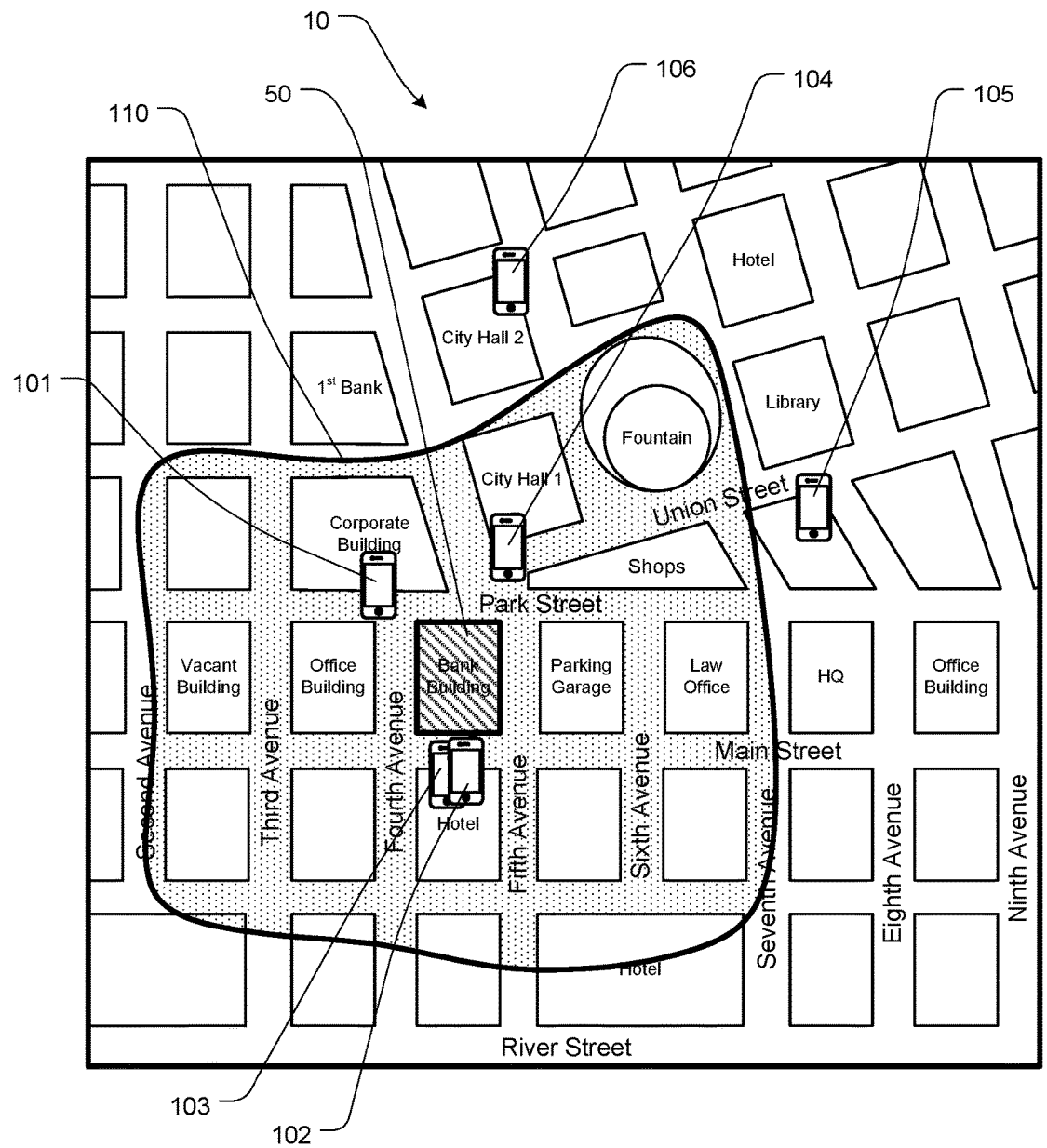
FIG. 4 illustrates a portion of an exemplary map, wherein the exemplary map identifies a discrete geographic location, provides representations of discrete mobile electronic devices, and provides a representation of an exemplary geo-darkened area located within the area illustrated by the exemplary map, according to the present disclosure.

While FIG. 2 illustrates the geo-fenced area 110 as being substantially circular and extending a uniform distance from the centrally located, discrete geographic location 50, the geo-fenced area 100 may optionally be established in other manners. For example, as illustrated in FIG. 3, the geo-darkened area 110 is determined by a grid structure 130 superimposed over the map 10, according to the present disclosure. The geo-darkened area 110 may then be established, utilizing one or a combination of grid squares provided by the grid structure 130. In still other exemplary, nonlimiting embodiments, as illustrated in FIG. 4, the geo-darkened area 110 is determined in a more random fashion, by a series of determined areas or points, used to selectively establish the geo-darkened area 110.

Thus, it should be appreciated that the geo-darkened area 110 represents a virtual perimeter or area, depicted on the map 10, and representing a real-world geographic area. The geo-darkened area 110 may be established automatically or manually, may take any initial, expanded, or contracted area, and may be substantially static or substantially dynamic.

In various exemplary embodiments, the geo-darkened area 110 is established, utilizing geo-fencing.

Utilizing the features of the present disclosure, following the exemplary steps shown in FIG. 5, if an incident is in progress and the systems and/or methods of the present disclosure are initiated, the exemplary method begins at step S100 and control continues to step S105, wherein a discrete geographic location, such as, for example, discrete geographic location 50 is identified. As described herein, the discrete geographic location 50 is typically identified based on an incident requiring the assistance of law enforcement, search and rescue personnel, and/or first responders.

Once the discrete geographic location 50 has been identified, the method advances to step S110, wherein a map, such as, for example, the map 10 of FIG. 1, is generated for and displayed to authorized user(s). In various exemplary embodiments, authorized user(s) may optionally be members or representatives of law enforcement, homeland security, or a comparable government agency. Alternatively, authorized user(s) may be any individual or group authorized to utilize the systems and/or methods of the present disclosure.

Next, in step S115, each identifiable mobile electronic device within at least a portion of the area represented by the map 10 is identified. In various exemplary embodiments, each identifiable mobile electronic device is identified utilizing GPS location information provided by each mobile electronic device. It is understood that certain mobile electronic devices, within at least a portion of the area represented by the map 10, will be unidentifiable or hidden from the systems and/or methods of the present disclosure. For example, if a mobile electronic device is not running appropriate software, is turned off, is not receiving a signal, the mobile electronic device will not be discoverable or identifiable by the systems and/or methods of the present disclosure.

The method then advances to step S120 and a graphical representation of each identifiable mobile electronic device is provided on the map 10, identifying the proximate location of each identifiable mobile electronic device on the map 10. As illustrated in FIGS. 2-4, the identifiable mobile electronic devices are identified as mobile electronic device 101-106. In this manner, the authorized user(s) is/are able to review the map 10 and identify the discrete geographic location 50 as well as the number and placement of various mobile electronic devices, illustrated as mobile electronic devices 101-106.

The method then advances to step S125 and a geo-fence perimeter is established around the discrete geographic location 50. The geo-fence perimeter is then utilized to produce the geo-darkened area 110. The geo-fence perimeter and the resulting geo-darkened area 110 may be created automatically or manually and may be established in any desired size or shape. Once the geo-fence perimeter is established, the method advances to step S130 and the systems and/or methods of the present disclosure restrict at least some image and/or data exchange capabilities of at least some of the mobile electronic devices 101-106 located within the geo-fence perimeter or geo-darkened area 110.

In certain exemplary, nonlimiting embodiments, at least some image and/or data exchange capabilities of each of the mobile electronic devices 101-106 located within the geo-fenced perimeter or geo-darkened area 110. Alternatively, at least some select mobile electronic devices 101-106 are optionally selected so that they are unaffected by the geo-darkening and the image and/or data exchange capabilities of the selected mobile electronic devices 101-106 are unaffected by the geo-darkening. For example, as illustrated in FIG. 1, mobile electronic devices 101, 102, 103, and 104 are located within the exemplary geo-darkened area 110 and are subject to the geo-darkened embargo. However, mobile electronic device 104 may optionally be selected or identified such that, while being located within the exemplary geo-darkened area 110, mobile electronic device 104 is exempted from the geo-darkened embargo. Thus, the systems and/or methods of the present disclosure allow certain mobile electronic devices located within the geo-fenced perimeter or geo-darkened area 110 to be subject to the geo-darkened embargo (i.e., geo-darkened), while other mobile electronic devices located within the geo-fenced perimeter or geo-darkened area 110 are selectively exempted from the geo-darkened embargo (i.e., geo-whitened).

As illustrated in FIGS. 2-4, mobile electronic devices 101, 102, 103, and 104 are located within the exemplary geo-darkened area 110 and are subject to the geo-darkened embargo, while mobile electronic devices 105 and 106 are located outside of the exemplary geo-darkened area 110 and are not subject to the geo-darkened embargo. Thus, the ability of mobile electronic devices 101, 102, 103, and 104 to exchange image and/or data may be restricted or selectively restricted, while the ability of mobile electronic devices 105 and 106 to exchange image and/or data remains unrestricted.

In certain exemplary, nonlimiting embodiments of the present disclosure, while the mobile electronic devices 101, 102, 103, and 104 are subject to a geo-darkened embargo, images and/or data may still be captured or generated by each of the mobile electronic devices 101, 102, 103, and 104. The captured images and/or data optionally be stored to each mobile electronic device's internal storage, but cannot be indiscriminately uploaded or shared.

In certain exemplary, nonlimiting embodiments an alert is posted on the display of the user's mobile electronic device telling them that their mobile electronic device is geo-darkened or embargoed for security purposes. The message to the user may also inform them that any images and/or data being captured or created by the mobile electronic device is being stored remotely for potential later access.

Optionally, while the mobile electronic device is subject to the geo-darkened embargo, the systems and methods of the present disclosure control the mobile electronic device, utilizing a non-erase lock. If utilized, the non-erase lock is applied to images and/or data recorded during the geo-darkened or embargo period and ensures that images and/or data recorded during the geo-darkened or embargo period cannot be modified, deleted, or erased for a determined period of time following the removal of the geo-darkened embargo.

While mobile electronic devices subject to the geo-darkened embargo are restricted in their ability to exchange images and/or data, the remaining functions, such as geo-location, continue to operate on the mobile electronic devices and users can utilize the remaining functions of the mobile electronic device.

The method then advances to step S135 and the systems and/or methods of the present disclosure control each of the mobile electronic devices 101, 102, 103, and 104 to automatically upload any generated images and/or data for remote storage.

In various exemplary embodiments, the systems and/or methods of the present disclosure provide for delayed availability of the uploaded and remotely stored images and/or data. For example, when the geo-darkened area 110 is removed, the normal exchange of images and/or data is restored to each of the mobile electronic devices previously within the geo-darkened area 110 and subject to the geo-darkened embargo.

In step S140, while the mobile electronic devices 101, 102, 103, and 104 are subject to a geo-darkened embargo, all uploaded images and/or data are optionally made available to the authorized user(s). In this manner, law enforcement officials, for example, have access to images and/or data that may be useful as they address or respond to the incident.

This continues so long as the incident remains active. It should also be appreciated that, while the incident remains active, the geo-darkened area 110 may be automatically or manually altered, based on the ongoing incident.

When it is determined that the incident has been resolved, the method advances to step S145 and the geo-darkened embargo, within the geo-darkened area 110 is removed. When the geo-darkened embargo, within the geo-darkened area 110 is removed, the method continues to step S150, where the method ends. This results in the removal of the previously geo-darkened embargo of mobile electronic devices 101, 102, 103, and 104, allowing the mobile electronic devices 101, 102, 103, and 104 to return to normal function.

In various exemplary embodiments, when the geo-darkened embargo, within the geo-darkened area 110 is removed, all of the uploaded images and/or data are optionally made available to the respective users of the mobile electronic devices 101, 102, 103, and 104 and/or other designated users, such as, for example, various authorized media outlets.

While the exemplary steps of the flowchart, as shown in FIG. 5, are described in reference to being utilized by an authorized user(s). It should be appreciated that one or more, and optionally all, of the steps of the flowchart, as shown in FIG. 5, may be performed automatically or in a semi-automated fashion, using predetermined response protocols. It should also be understood and appreciated that certain of the steps of the flowchart, as shown in FIG. 5, are optional and one or more of the steps of the flowchart, as shown in FIG. 5, may be omitted during use of the systems and/or methods of the present disclosure.

FIG. 6 illustrates an exemplary flowchart outlining certain exemplary steps for at least temporarily embargoing or restricting the exchange of images and/or data, via mobile electronic devices, within a determined geographic area, according to the present disclosure. Utilizing the features of the present disclosure, following the exemplary steps shown in FIG. 6, if an incident is in progress and the systems and/or methods of the present disclosure are initiated, the exemplary method begins at step S200 and control continues to step S210, wherein a discrete geographic location, such as, for example, discrete geographic location 50 is identified. As described herein, the discrete geographic location 50 is typically identified based on an incident requiring the assistance of law enforcement, search and rescue personnel, and/or first responders.

Once the discrete geographic location 50 has been identified, the method advances to step S220, wherein a geo-fence perimeter is established around the discrete geographic location 50. The geo-fence perimeter is then utilized to produce the geo-darkened area 110. The geo-fence perimeter and the resulting geo-darkened area 110 may be created automatically or manually and may be established in any desired size or shape.

Once the geo-fence perimeter is established, the method advances to step S230 and the systems and/or methods of the present disclosure restrict at least some image and/or data exchange capabilities of at least some of the mobile electronic devices located within the geo-fence perimeter or geo-darkened area 110.

In certain exemplary, nonlimiting embodiments, at least some image and/or data exchange capabilities of each of the mobile electronic devices 101-106 located within the geo-fenced perimeter or geo-darkened area 110. Alternatively, at least some select mobile electronic devices 101-106 are optionally selected so that they are unaffected by the geo-darkening and the image and/or data exchange capabilities of the selected mobile electronic devices 101-106 are unaffected by the geo-darkening. For example, as illustrated in FIG. 1, mobile electronic devices 101, 102, 103, and 104 are located within the exemplary geo-darkened area 110 and are subject to the geo-darkened embargo. However, mobile electronic device 104 may optionally be selected or identified such that, while being located within the exemplary geo-darkened area 110, mobile electronic device 104 is exempted from the geo-darkened embargo. Thus, the systems and/or methods of the present disclosure allow certain mobile electronic devices located within the geo-fenced perimeter or geo-darkened area 110 to be subject to the geo-darkened embargo (i.e., geo-darkened), while other mobile electronic devices located within the geo-fenced perimeter or geo-darkened area 110 are selectively exempted from the geo-darkened embargo (i.e., geo-whitened).

As illustrated in FIGS. 2-4, mobile electronic devices 101, 102, 103, and 104 are located within the exemplary geo-darkened area 110 and are subject to the geo-darkened embargo, while mobile electronic devices 105 and 106 are located outside of the exemplary geo-darkened area 110 and are not subject to the geo-darkened embargo. Thus, the ability of mobile electronic devices 101, 102, 103, and 104 to exchange image and/or data may be restricted or selectively restricted, while the ability of mobile electronic devices 105 and 106 to exchange image and/or data remains unrestricted.

In certain exemplary, nonlimiting embodiments of the present disclosure, while the mobile electronic devices 101, 102, 103, and 104 are subject to a geo-darkened embargo, images and/or data may still be captured or generated by each of the mobile electronic devices 101, 102, 103, and 104. The captured images and/or data optionally be stored to each mobile electronic device's internal storage, but cannot be indiscriminately uploaded or shared.

The method then advances to step S240 and the systems and/or methods of the present disclosure control each of the mobile electronic devices 101, 102, 103, and 104 to automatically upload any generated images and/or data for remote storage.

In various exemplary embodiments, the systems and/or methods of the present disclosure provide for delayed availability of the uploaded and remotely stored images and/or data. For example, when the geo-darkened area 110 is removed, the normal exchange of images and/or data is restored to each of the mobile electronic devices previously within the geo-darkened area 110 and subject to the geo-darkened embargo.

Then, in step S250, while the mobile electronic devices 101, 102, 103, and 104 are subject to a geo-darkened embargo, all uploaded images and/or data are optionally made available to the authorized user(s). In this manner, law enforcement officials, for example, have access to images and/or data that may be useful as they address or respond to the incident.

This continues so long as the incident remains active. It should also be appreciated that, while the incident remains active, the geo-darkened area 110 may be automatically or manually altered, based on the ongoing incident.

When it is determined that the incident has been resolved, the method advances to step S260 and the geo-darkened embargo, within the geo-darkened area 110 is removed. When the geo-darkened embargo, within the geo-darkened area 110 is removed, the method continues to step S270, where the method ends. This results in the removal of the previously geo-darkened embargo of mobile electronic devices 101, 102, 103, and 104, allowing the mobile electronic devices 101, 102, 103, and 104 to return to normal function.

In various exemplary embodiments, when the geo-darkened embargo, within the geo-darkened area 110 is removed, all of the uploaded images and/or data are optionally made available to the respective users of the mobile electronic devices 101, 102, 103, and 104 and/or other designated users, such as, for example, various authorized media outlets.

While the presently disclosed systems and/or methods have been described in conjunction with the exemplary embodiments outlined above, the foregoing description of exemplary embodiments of the presently disclosed systems and/or methods, as set forth above, are intended to be illustrative, not limiting and the fundamental disclosed systems and/or methods should not be considered to be necessarily so constrained. It is evident that the presently disclosed systems and/or methods is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems and/or methods belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems and/or methods, such that others may, by applying current knowledge, change, vary, modify, and/or adapt these exemplary, non-limiting embodiments for various applications without departing from the spirit and scope of the presently disclosed systems and/or methods and elements or methods similar or equivalent to those described herein can be used in practicing the presently disclosed systems and/or methods. Any and all such changes, variations, modifications, and/or adaptations should and are intended to be comprehended within the meaning and range of equivalents of the disclosed exemplary embodiments and may be substituted without departing from the true spirit and scope of the presently disclosed systems and/or methods.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A method for selective geo-darkening of mobile electronic devices, comprising:
identifying a discrete geographic location;
generating a map, wherein the map represents a real-world geographic area surrounding at least a portion of the discrete geographic location;
identifying each identifiable mobile electronic device within at least a portion of the area represented by the map;
determining a proximate location of each identifiable mobile electronic device;
providing a graphical representation of each identifiable mobile electronic device on the map;
establishing a geo-fence perimeter around at least a portion of the discrete geographic location;
providing a graphical representation of the geo-fence perimeter on the map, wherein the geo-fence perimeter represents a virtual perimeter or area, depicted on the map, representing a real-world geographic area;
controlling each of the identifiable mobile electronic devices to restrict at least some image and/or data exchange capabilities of each of the identifiable mobile electronic devices located within the geo-fence perimeter;
controlling each of the identifiable mobile electronic devices to upload images and/or data captured or generated by each of the identifiable mobile electronic devices for storage remote from each of the identifiable mobile electronic devices;
removing the geo-fence perimeter; and
controlling each electronic mobile device to allow unrestricted operation of the image and/or data exchange capabilities of each of the identifiable mobile electronic devices.

2. The method of claim 1, further comprising:
allowing the uploaded images and/or data captured or generated by each of the identifiable mobile electronic devices to be accessed by at least one authorized user.

3. The method of claim 1, wherein
controlling each electronic mobile device to allow unrestricted operation of the image and/or data exchange capabilities of each of the identifiable mobile electronic devices, comprises controlling each electronic mobile device to allow unrestricted operation of the image and/or data exchange capabilities of each of the identifiable mobile electronic devices after the geo-fence perimeter has been removed.

4. The method of claim 1, further comprising:
allowing, after the geo-fence perimeter has been removed, access any image and/or data that was uploaded for storage remote from each of the identifiable mobile electronic devices.

5. The method of claim 1, further comprising:
allowing, after the geo-fence perimeter has been removed, each discrete, identifiable mobile electronic device to access any image and/or data that was uploaded for storage remote from that discrete, identifiable mobile electronic device.

6. The method of claim 1, wherein the discrete geographic location is identified as a location of an incident.

7. The method of claim 1, wherein the map is only displayed to one or more authorized users.

8. The method of claim 1, each identifiable mobile electronic device is identified utilizing GPS location information provided by the identifiable mobile electronic device.

9. The method of claim 1, wherein the image and/or data exchange capabilities of each identifiable mobile electronic device located within the geo-fence perimeter are controlled via software executing commands to the identifiable mobile electronic device.

10. The method of claim 1, wherein controlling each identifiable mobile electronic device to restrict at least some image and/or data exchange capabilities of the identifiable mobile electronic device located within the geo-fence perimeter further comprises controlling each identifiable mobile electronic device such that images and/or data cannot be modified, deleted, or erased from the identifiable mobile electronic device.

11. The method of claim 1, wherein controlling each identifiable mobile electronic device to restrict at least some image and/or data exchange capabilities of the identifiable mobile electronic device located within the geo-fence perimeter does not restrict the ability of the identifiable mobile electronic device to transmit geolocation data.

12. A method for selective geo-darkening of mobile electronic devices, comprising:
identifying a discrete geographic location;
establishing a geo-fence perimeter around at least a portion of the discrete geographic location;
controlling each identifiable mobile electronic device within the established geo-fence perimeter to restrict at least some image and/or data exchange capabilities of the identifiable mobile electronic device located within the geo-fence perimeter;
controlling each identifiable mobile electronic device to upload images and/or data captured or generated by each of the identifiable mobile electronic devices for storage remote from each of the identifiable mobile electronic devices;
removing the geo-fence perimeter; and
controlling each electronic mobile device to allow unrestricted operation of the image and/or data exchange capabilities of each of the identifiable mobile electronic devices.

13. The method of claim 12, further comprising:
allowing the uploaded images and/or data captured or generated by each of the identifiable mobile electronic devices to be accessed by at least one authorized user.

14. The method of claim 12, wherein
controlling each electronic mobile device to allow unrestricted operation of the image and/or data exchange capabilities of each of the identifiable mobile electronic devices, comprises controlling each electronic mobile device to allow unrestricted operation of the image and/or data exchange capabilities of each of the identifiable mobile electronic devices after the geo-fence perimeter has been removed.

15. The method of claim 12, further comprising:
allowing, after the geo-fence perimeter has been removed, access any image and/or data that was uploaded for storage remote from each of the identifiable mobile electronic devices.

16. The method of claim 12, wherein the discrete geographic location is identified as a location of an incident.

17. The method of claim 12, each identifiable mobile electronic device is identified utilizing GPS location information provided by the identifiable mobile electronic device.

18. The method of claim 12, wherein the image and/or data exchange capabilities of each identifiable mobile electronic device located within the geo-fence perimeter are controlled via software executing commands to the identifiable mobile electronic device.

19. The method of claim 12, wherein controlling each identifiable mobile electronic device to restrict at least some image and/or data exchange capabilities of the identifiable mobile electronic device located within the geo-fence perimeter further comprises controlling each identifiable mobile electronic device such that images and/or data cannot be modified, deleted, or erased from the identifiable mobile electronic device.

20. A method for selective geo-darkening of mobile electronic devices, comprising:
   identifying at least one discrete geographic location;
   establishing a geo-fence perimeter around at least a portion of the at least one discrete geographic location;
   controlling each identifiable mobile electronic device within the established geo-fence perimeter to restrict at least some image and/or data exchange capabilities of the identifiable mobile electronic device located within the geo-fence perimeter;
   controlling each identifiable mobile electronic device to upload images and/or data captured or generated by each of the identifiable mobile electronic devices for storage remote from each of the identifiable mobile electronic devices;
   allowing the uploaded images and/or data captured or generated by each of the identifiable mobile electronic devices to be accessed by at least one authorized user;
   removing the geo-fence perimeter; and
   controlling each electronic mobile device to allow unrestricted operation of the image and/or data exchange capabilities of each of the identifiable mobile electronic devices.

* * * * *